June 29, 1926.

J. C. STROMATT

PLOW

Filed Oct. 9, 1925

1,590,916

Inventor

J. C. Stromatt.

By Lacy & Lacy, Attorneys

Patented June 29, 1926.

1,590,916

UNITED STATES PATENT OFFICE.

JOSEPH C. STROMATT, OF CALDWELL COUNTY, KENTUCKY.

PLOW.

Application filed October 9, 1925. Serial No. 61,532.

This invention relates to agricultural implements and more particularly to such as are designed for preparing the soil to receive the seed, or for cultivating.

The invention provides an implement that may be used as a plow or a cultivator and to which may be fitted different shovel blades or plow points, whereby to adapt the same for use as a right hand or a left hand plow, or for operation on the side of a hill and for a variety of work as may be found necessary.

While the drawings illustrate a preferred embodiment of the invention it is to be understood that in adapting the means to meet specific needs and requirements the design may be varied, and such other changes in the minor details of construction may be resorted to within the scope of the invention as claimed without departing from the spirit thereof.

For a full understanding of the invention and the merits thereof, reference is to be had to the following description and the drawings hereto attached in which,—

Corresponding and like parts are referred to in the following description and indicated in the several views of the drawings by like reference characters.

Figure 1:
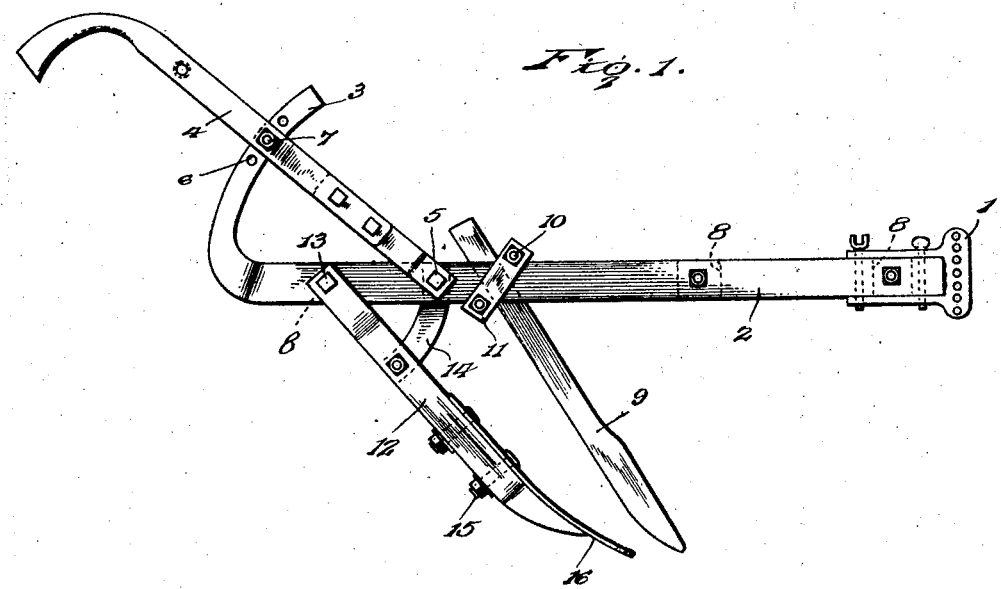
Figure 1 is a side view of a plow illustrative of the invention.
Figure 2:
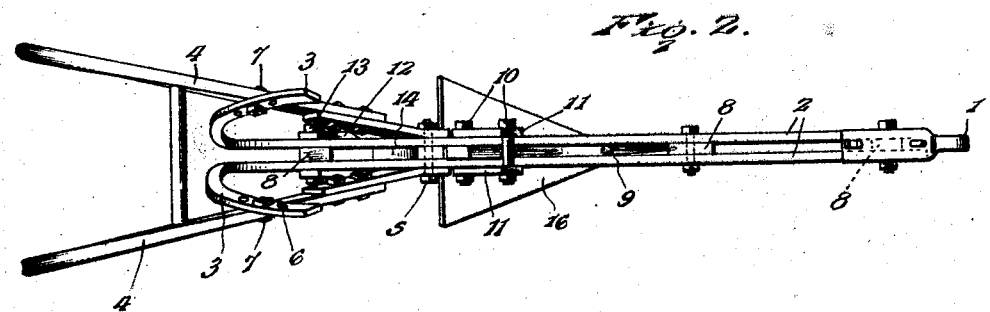
Figure 2 is a top plan view of the implement.

The implement embodies a beam to the front end of which is attached a clevis 1 of any approved type, and in the present instance the beam consists of similar members 2 disposed in spaced relation and having their rear ends curved upwardly and forwardly as indicated at 3 to form in effect braces for handle bars 4, which are pivoted at their lower ends to the beam as indicated at 5, the pivot fastening preferably consisting of a bolt which passes through openings formed in the overlapping parts in coincident relation. The braces 3 are curved concentric with the pivot fastening 5 and are formed with a plurality of openings 6 to coact with fastenings 7 for securing the handle bars 4 in the required adjusted position. Suitable spacers 8 are interposed between the members 2 to hold them spaced apart a predetermined distance.

A colter 9 of any usual or preferred formation is adjustably connected to the beam and its upper portion passes between the members 2 and is clamped therebetween by bolts 10 and plates 11, the latter being arranged exterior to the members 2 and having their ends projecting and apertured to receive the bolts 10. The construction is such as to admit of the colter being adjusted to any desired point in the length of the beam or moved up or down so as to penetrate the soil to the requisite depth.

Figure 3:
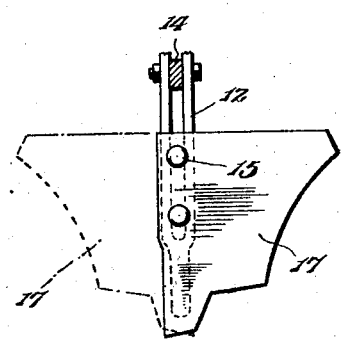
Figure 3 is a front view of the lower portion of the standard, the full and dotted lines showing a mold board shovel blade fitted to opposite sides of the standard.

The standard 12 comprises similar members pivotally connected at their upper ends to the beam 2 by a bolt or like fastening 13 which passes through registering openings formed in the overlapping part. A brace 14 interposed between the sandard 12 and the beam fixes the position of the standard and is secured to the beam by the fastening 5 which attaches the handle bars thereto. The lower ends of the members comprising the standard 12 are drawn together, as indicated most clearly in Figure 3, and the heel bolts 15 employed for attaching the points or blades to the standard, pass between the members thereof and the shovel blade may be pointed, as indicated at 16, or may have the form of a mold board as indicated at 17, and the mold board may be right or left to be fitted to either side of the standard as indicated by the full and dotted lines in Figure 3, so that the implement may be converted into a right hand or a left hand plow as required. When the implement is adapted for use as a cultivator a point substantially of the form indicated at 16 is attached to the foot of the standard and when the implement is to be used for turning a furrow a mold board is applied to the standard substantially as indicated in Figure 3, and said mold board may be of a form to admit of the implement being used either as a right hand or a left hand plow.

Having thus described the invention, I claim:

1. An implement of the character specified comprising a beam consisting of companion members laterally spaced and having their rear portions curved upwardly, forwardly and laterally, handle bars pivoted at their lower ends to the beam and adjustably connected intermediate their ends to the upwardly, forwardly and laterally curved extensions thereof, and earth treating devices mounted upon the beam.

2. An agricultural implement comprising a beam embodying transversely spaced companion members, having their rear portions curved upwardly, forwardly and laterally, handle bars pivoted at their lower ends to the beam and adjustably connected intermediate their ends to the upwardly, forwardly and laterally curved rear portions of the members comprising the beam, a colter adjustably connected to the beam, a standard attached to the beam in the rear of the handle bars, a brace between the standard and beam, and a shovel blade detachably fitted to the foot of the standard.

In testimony whereof I affix my signature.

JOSEPH C. STROMATT. [L.S.]